US009739425B2

(12) United States Patent
Bennett

(10) Patent No.: US 9,739,425 B2
(45) Date of Patent: Aug. 22, 2017

(54) WATER MANIFOLD AND VALVE HOLDER

(71) Applicant: B&R Plastics, Inc., Denver, CO (US)

(72) Inventor: Kenneth Eugene Bennett, Elizabeth, CO (US)

(73) Assignee: B&R Plastics, Inc., Denver, CO (US)

( * ) Notice: Subject to any disclaimer, the term of this patent is extended or adjusted under 35 U.S.C. 154(b) by 164 days.

(21) Appl. No.: 14/715,327

(22) Filed: May 18, 2015

(65) Prior Publication Data

US 2015/0330578 A1    Nov. 19, 2015

Related U.S. Application Data

(60) Provisional application No. 61/994,230, filed on May 16, 2014.

(51) Int. Cl.
*F17D 1/08* (2006.01)
*E03B 9/04* (2006.01)

(52) U.S. Cl.
CPC .................. *F17D 1/08* (2013.01); *E03B 9/04* (2013.01); *Y10T 137/0402* (2015.04); *Y10T 137/0491* (2015.04); *Y10T 137/5327* (2015.04); *Y10T 137/6851* (2015.04); *Y10T 137/6991* (2015.04)

(58) Field of Classification Search
CPC ... E02D 27/42; E02D 27/46; Y10T 137/6991; Y10T 137/5327; Y10T 137/6851; E03B 9/00; E03B 9/04; E03B 9/08; E03B 9/10; E03B 9/12; F17D 1/08
USPC ...... 137/272–308, 363–373; 220/567.1, 628, 220/629, 630, 484; 52/167.1, 169.11, 52/169.13; 239/201
See application file for complete search history.

(56) References Cited

U.S. PATENT DOCUMENTS

| 408,091 | A | * | 7/1889 | Ette | E03B 9/20 137/287 |
| 964,784 | A | * | 7/1910 | James | E03B 9/02 137/294 |
| 3,658,086 | A | * | 4/1972 | Hart | F16K 27/006 137/368 |
| 3,662,956 | A | * | 5/1972 | Hedman | B05B 15/062 239/201 |
| 3,929,288 | A | * | 12/1975 | Brusadin | B05B 15/062 239/201 |
| 4,344,645 | A | * | 8/1982 | Kirk | B65D 90/12 220/630 |
| 7,004,677 | B1 | * | 2/2006 | Ericksen | A01G 25/162 137/364 |
| 7,575,018 | B2 | * | 8/2009 | Smith | F16K 3/0254 137/366 |
| 7,650,900 | B1 | * | 1/2010 | Meyers | E03B 9/04 137/15.08 |
| 9,487,934 | B1 | * | 11/2016 | Davis | E03B 7/12 |
| 9,528,659 | B2 | * | 12/2016 | Manser | F16M 11/04 |

(Continued)

*Primary Examiner* — Michael R Reid
*Assistant Examiner* — Jonathan Waddy
(74) *Attorney, Agent, or Firm* — William W. Cochran; Cochran Freund & Young LLC

(57) ABSTRACT

Disclosed is a water manifold that provides a sturdy platform for both distributing water to various other locations or nodes and providing a support platform for a yard hydrant. The manifold is constructed of plastic and will not corrode. Further, the manifold is sturdy and provides a sufficiently large surface area to prevent sinking or tilting of the yard hydrant.

7 Claims, 11 Drawing Sheets

(56) References Cited

U.S. PATENT DOCUMENTS

| | | | |
|---|---|---|---|
| 2003/0178094 A1* | 9/2003 | Ageheim | F16L 9/19 141/86 |
| 2005/0023375 A1* | 2/2005 | Tanczos | B05B 15/001 239/288 |
| 2009/0266016 A1* | 10/2009 | Kraft | E02D 27/42 52/296 |
| 2011/0140412 A1* | 6/2011 | Manser | F17C 13/084 285/192 |
| 2011/0180159 A1* | 7/2011 | Ericksen | F16K 27/12 137/364 |
| 2015/0088322 A1* | 3/2015 | Antel | F16K 27/003 700/284 |
| 2015/0191886 A1* | 7/2015 | Okobi | E02D 5/801 52/157 |

* cited by examiner

WATER MANIFOLD AND VALVE HOLDER

BACKGROUND OF THE INVENTION

Sprinkling systems and other watering systems have been used for some time to water grass, gardens and crops. Water supplies have typically been distributed through underground piping. In many instances, one inch flexible water hose has been used to distribute water to various locations for lawns, golf courses, gardens, plant nurseries and other growing facilities.

SUMMARY OF THE INVENTION

An embodiment of the present invention may therefore comprise a method of providing a plastic manifold for distributing water underground and providing a stable platform for a yard hydrant having a self-draining riser tube comprising: forming conduits in the plastic manifold that are adapted to receive and supply water from underground water lines in an underground location; forming a substantially perpendicular conduit in the plastic manifold that is adapted to connect to the riser tube; forming a top edge flange and a bottom edge flange around a periphery of the manifold that engage underground materials to assist in maintaining the manifold as a solid platform; forming floor panels that further engage underground materials and assist in maintaining the manifold in a stable vertical position underground so that the plastic manifold does not sink in the underground location.

An embodiment of the present invention may further comprise a plastic manifold for distributing water comprising: a top edge flange that extends around an upper peripheral portion of the manifold and that is adapted to engage underground materials to support the manifold; a bottom edge flange that extends around a lower peripheral portion of the manifold and that is adapted to engage underground materials to support the manifold; a plurality of first conduits that extend from the top edge flange and the bottom edge flange to a central portion of the manifold and intersect at the central portion to form a central cavity; a perpendicular conduit that is perpendicular to the plurality of first conduits and intersects the central cavity; a plurality of floor panels that are connected to the plurality of first conduits that support the plastic manifold in an underground location by engaging the underground materials.

An embodiment of the present invention may further comprise a holder for a water valve comprising: a valve mounting base having a detent that is adapted to receive the water valve, the valve mounting base having a bottom surface area that is sufficiently large to engage underground earthen materials and prevent rotation of the valve mounting base; valve mounting straps attached to the valve mounting base that are adapted to engage the water valve and hold the water valve securely on the valve mounting base so that the valve will not rotate.

An embodiment of the present invention may further comprise a method of preventing a water valve, disposed underground from rotating comprising: providing a valve mounting base having a detent that is adapted to receive the water valve, the valve mounting base having a bottom surface area that is sufficiently large to engage underground earthen materials and prevent rotation of the valve mounting base; attaching valve mounting straps to the valve mounting base that are adapted to engage the water valve and hold the water valve securely on the valve mounting base so that the valve will not rotate.

DETAILED DESCRIPTION OF THE EMBODIMENTS

Figure 1:
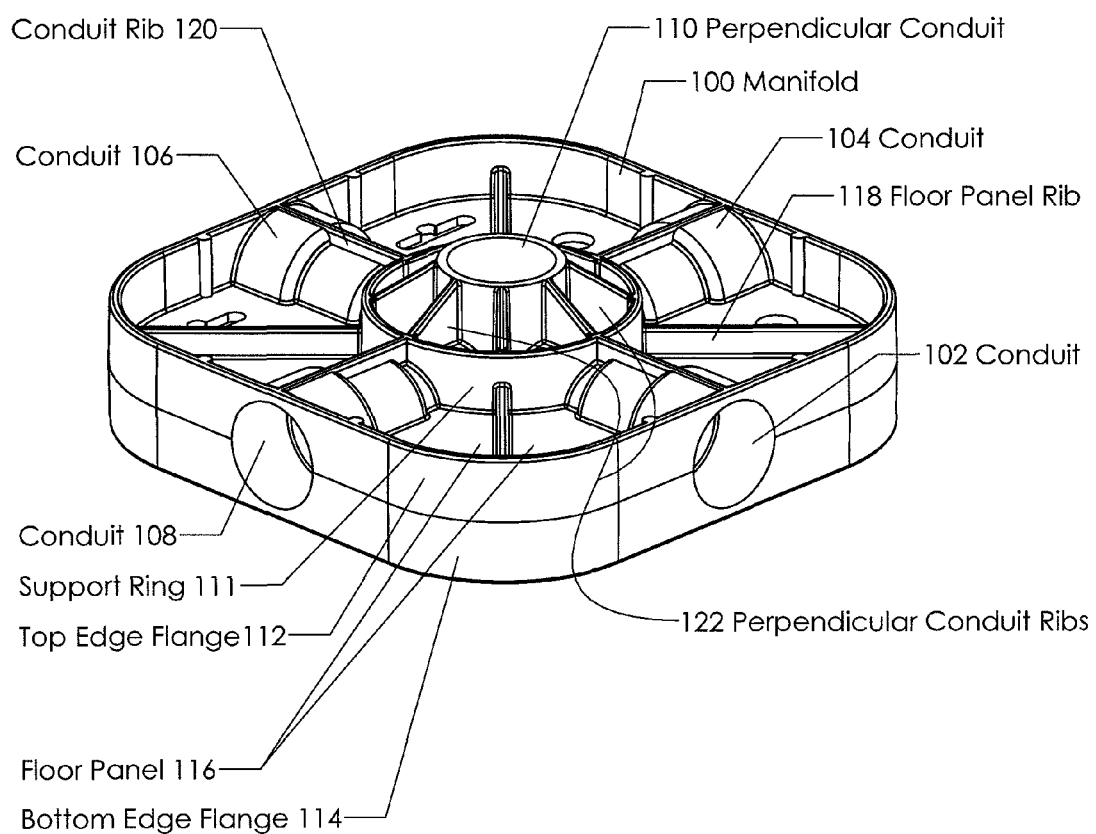
FIG. 1 is a perspective view of an embodiment of a manifold.

FIG. 1 is a perspective view of a manifold 100 that is used for distribution of water. The manifold 100 is typically used with sprinkler systems in which water is distributed to various locations. The manifold 100, illustrated in FIG. 1 has four conduits 102, 104, 106, 108, which are all connected at the center of the manifold 100. In addition, a perpendicular conduit 110 is connected to the other four conduits 102-108 at the intersection of the four conduits 102-108. Each one of the conduits 102-110 can function either as an input or an outlet for water. In one typical implementation, water may be fed into the manifold 100 through a conduit such as conduit 102 and distributed to conduits 104, 106, 108 and also to the perpendicular conduit 110, which may support a yard hydrant. In a typical implementation, the conduits 102-110 may use fittings for a one inch water supply pipe or tubing.

The manifold 100 has a top edge flange 112 and a bottom edge flange 114. At the intersection of the top edge flange 112 and the bottom edge flange 114 are various floor panels 116 that form a base or floor structure for the manifold 100. The manifold 100 also has four floor panel ribs 118 that connect the top edge flange 112 with support ring 111. Perpendicular conduit rings 122 provide support for the perpendicular conduit 110. Conduit ribs 120 connect to the top edge flange 112, the conduits 102-108 and the inner ring 111, to provide additional support to the perpendicular conduit 110. Conduit ribs 120 and floor panel ribs 118 are also present on the bottom of the manifold 100 and are laid out in the same configuration. The structure of the manifold 100, with the supporting ribs, provides a solid and sturdy structure. The manifold can be constructed from cross linked polyethylene, polycarbonate, ABS, PVC or other suitable plastic materials that will not break down, fracture, or corrode when placed in the ground.

Figure 2:
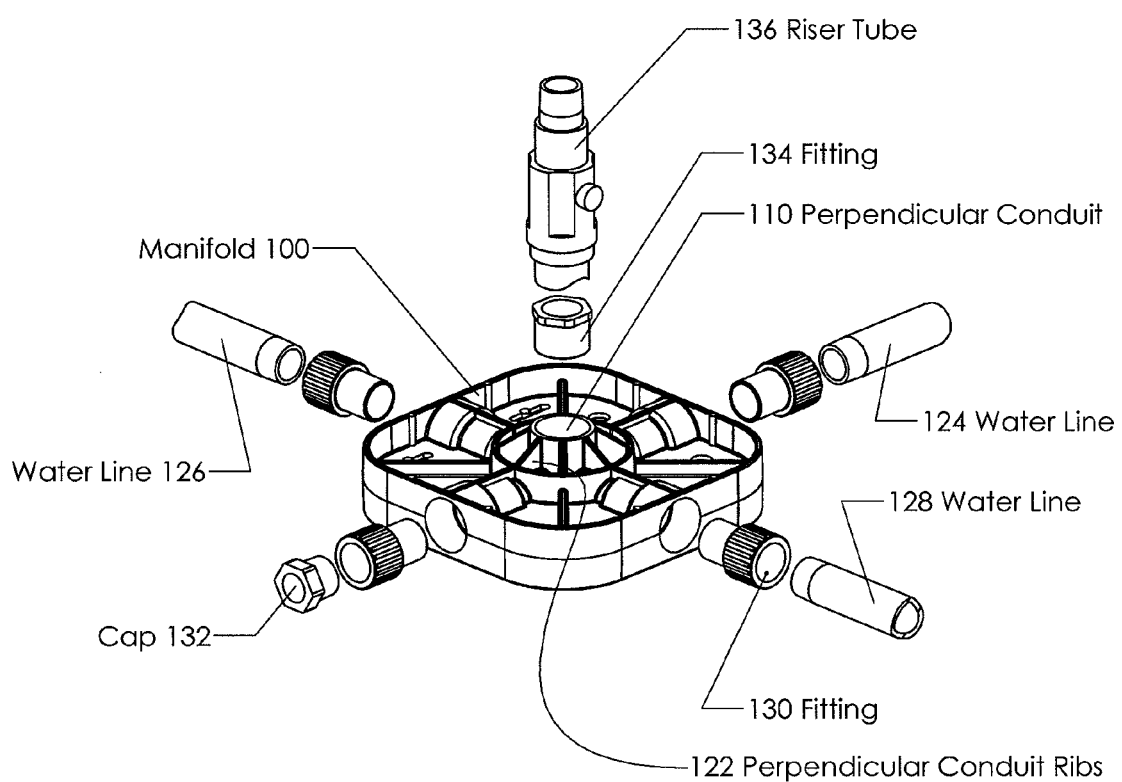
FIG. 2 is a perspective view of the embodiment of FIG. 1 of a manifold that is implemented in a predetermined manner illustrating various fittings in an exploded view.
Figure 4:
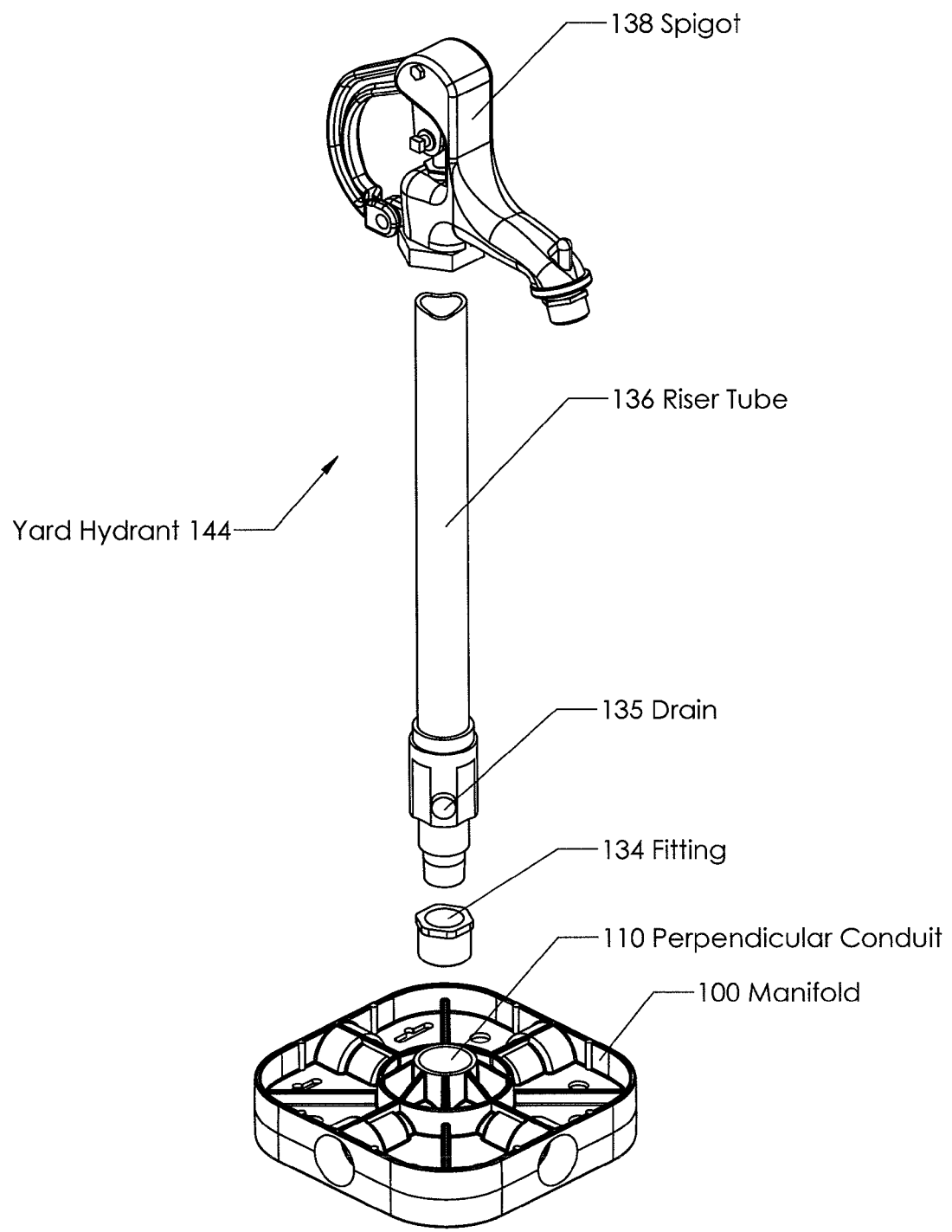
FIG. 4 is an assembled perspective view of the use of a spigot and riser tube with the manifold.

FIG. 2 is perspective view of the manifold 100 with a series of fittings and connections that can be used in accordance with one embodiment. Fittings, such as fitting 130, can be inserted in and glued to the opening of the various conduits 102-110. The fittings can be glued fittings, such as illustrated in FIG. 2, or threaded fittings. In fact, manifold 100 can be constructed to take any desired type of fitting. The fittings 130 may connect to water lines, such as water lines 124, 126, 128. The fittings can also be connected to a cap 132 to block the flow of water through any of the conduits 102-110. In this manner, water can be distributed from an input water line to at least two output water lines. Fitting 134 fits in the perpendicular conduit 110 that is adapted to receive a riser tube 136, which may be connected to a spigot 138 to form a yard hydrant 144 (FIG. 4). The perpendicular conduit ribs 122 provide extra support on the manifold 100 for holding the riser tube 136. In addition, the perpendicular conduit ribs 122 allow the perpendicular conduit 110 to extend away from the manifold body 100 to allow sufficient space for the fitting 134 and riser tube 136. Each of the conduits illustrated in FIG. 2 can be adapted to directly receive the water lines 124, 126, 128, cap 132 and the riser tube 136 and thereby eliminate the fittings, such as fitting 130, 134.

Figure 3:
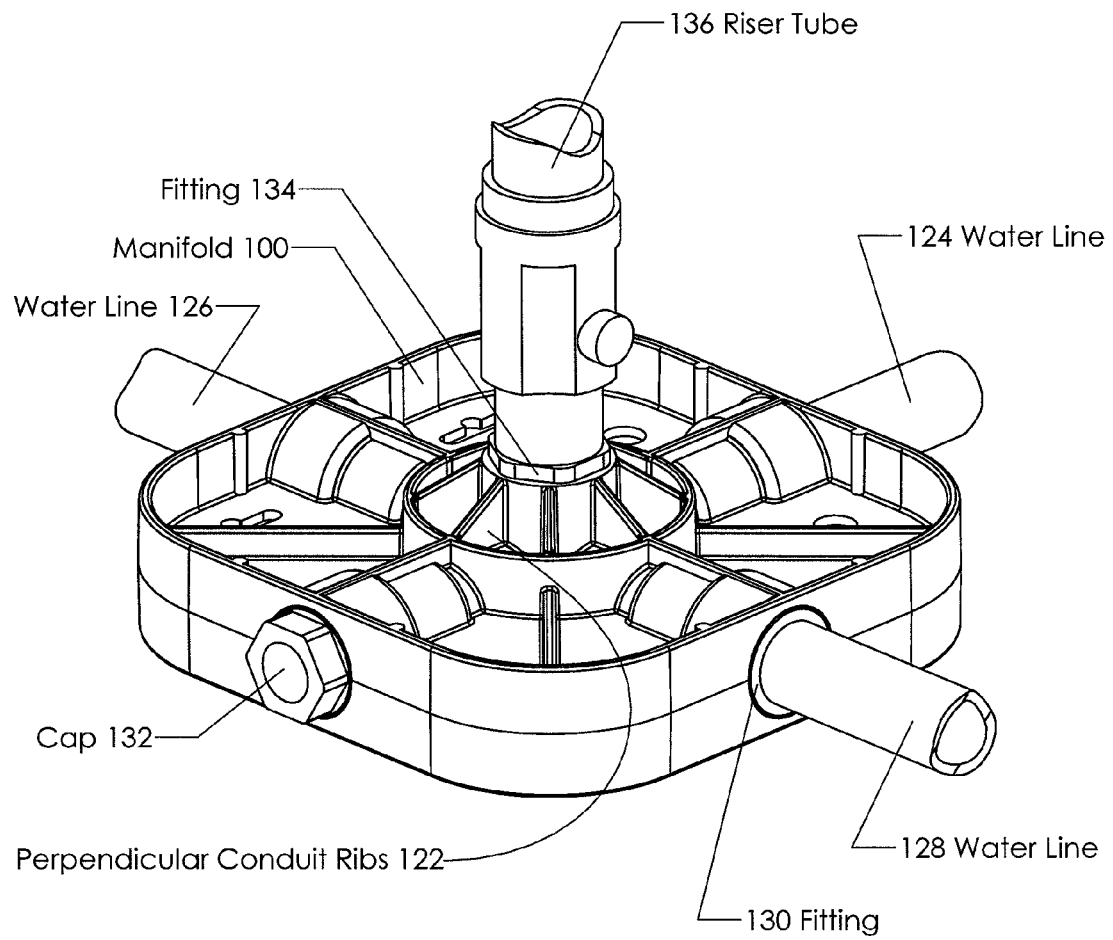
FIG. 3 is a perspective view of the implementation illustrated in FIG. 2 in an assembled view.

FIG. 3 is an illustration of the embodiment of FIG. 2 in an assembled condition. As illustrated in FIG. 3, the fittings 130, 134 are screwed, glued or otherwise attached to the conduits. Water lines 124, 126, 128 are attached to the fitting 130. Cap 132 is also attached to fitting 130. Riser tube 136 is attached to fittings 134. Perpendicular conduit ribs 122 support the riser tube 136 and provide additional support between the riser tube 136 and the manifold 100.

FIG. 4 is a perspective view of an implementation of the manifold 100. As illustrated in FIG. 4, fitting 134 is disposed in the perpendicular conduit 110. Riser tube 136 fits into the fitting 134. Riser tube 136 is connected to a spigot 138 to form yard hydrant 144, which allows water to be dispensed above ground. In this implementation, manifold 100 is buried below the surface of the ground and below the freeze level, which protects the water lines from freezing. The riser tube 136 includes a drain 135, which is mechanically coupled to the handle of spigot 138. When the spigot 138 is open by moving the handle, a mechanical linkage closes drain 135. When the handle of spigot 138 is closed, drain 135 opens. In that case, the water flows from the length of riser tube 136 to completely drain the riser tube 136 and prevent freezing in riser tube 136. However, the water that drains from the riser tube 136 travels onto the manifold 100 and surrounding dirt. This causes the dirt to soften and erode. The manifold 100, in this case, prevents erosion and helps to hold the assembly illustrated in FIG. 4 in a secure and solid position on the subterranean ground surface. In typical implementations, an elbow, tee, or star connection has been used to connect the riser tube 136 and spigot 138 to a water supply. The water released by the drain 135 quickly erodes around these types of connections, which results in an unstable surface for holding the riser tube 136 and spigot 138. In that regard, the manifold 100 provides a stable and solid surface on the ground that supports the riser tube 136 and spigot 138. Of course, the freeze line varies with the particular climate of an area in which the manifold is installed. For example, in mountainous areas in Colorado, the freeze line may be as much as three feet below the surface. In portions of the south, the freeze line may be one foot. In portions of southern Florida, the freeze line may be nonexistent. In such cases, the water lines may be buried for aesthetic and practical reasons rather than trying to avoid freezing of the water lines. In any event, many water distribution networks are buried underground, and yard hydrants are frequently used to provide access to the water distribution system.

Figure 5:
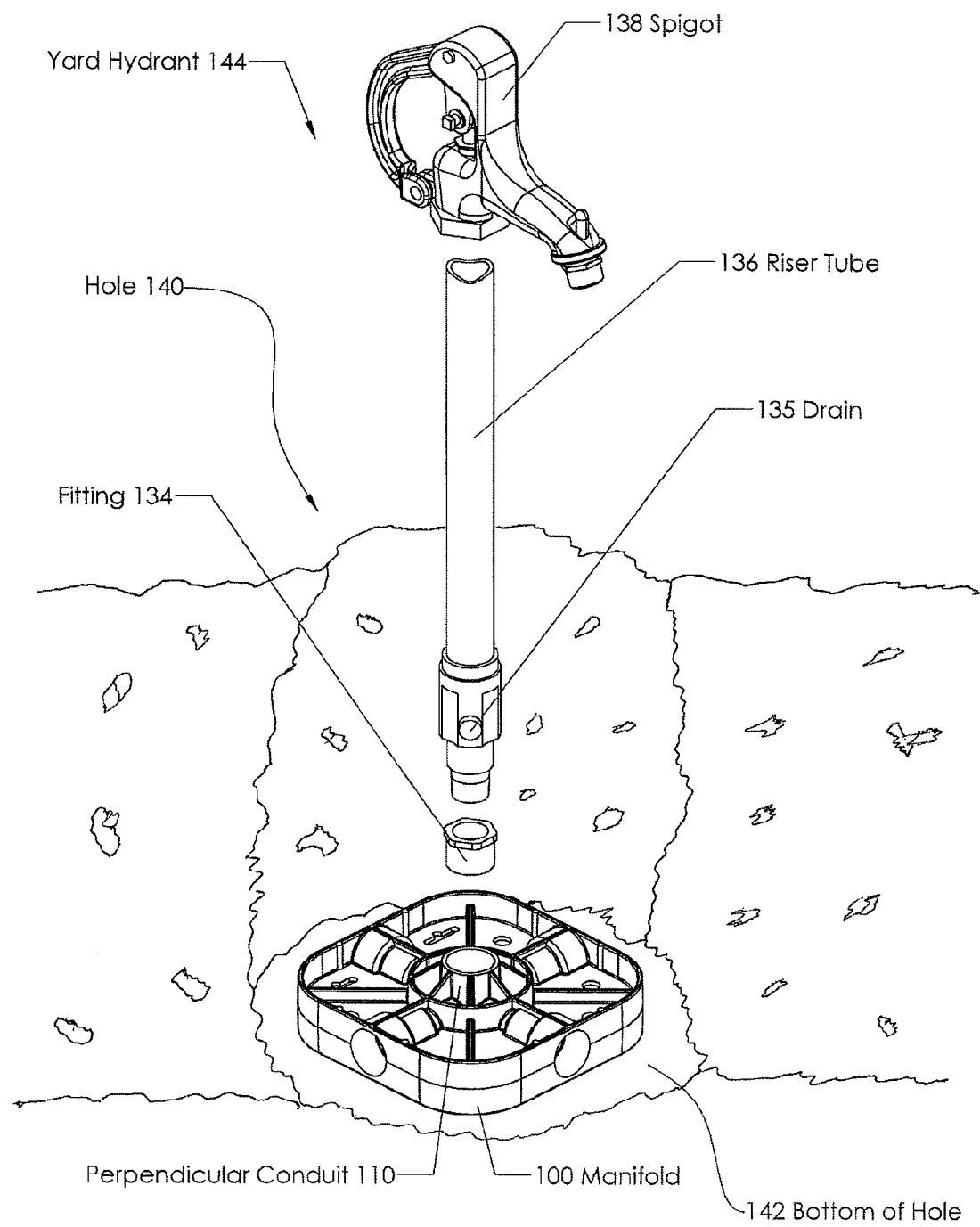
FIG. 5 is an assembled perspective view of the embodiment of FIG. 4 disposed in a hole in the ground.

FIG. 5 shows an implementation of the embodiment of FIG. 4. As shown in FIG. 5, the riser tube 136 is attached to a fitting 134, which fits in the perpendicular conduit 110 of manifold 100 to form yard hydrant 144. The hole 140 in the ground has a bottom 142 on which the manifold 100 sits. The bottom of the hole 142 is preferably a flat surface on which the manifold 100 sits and provides a stable platform for the manifold 100. Typically, the bottom of hole 142 is not compacted earth so that the bottom 142 is soft. In that case, the use of a 90 degree elbow connector sitting on a brick or rock or a tee fitting sitting on a brick or rock will tend to sink. However, the manifold 100 can be pressed into the soft earth at the bottom of the hole 142 and provide a stable platform for the yard hydrant 144. The bottom edge flange 114 (FIG. 1) sinks into the dirt or other earthen materials at the bottom of the hole 142 to hold the manifold 100 in a solid position. The manifold 100 will sink into the earthen materials at the bottom of the hole 142 until the earthen materials engage the floor panels 116. In this manner, the entire bottom surfaces of the manifold 100 are supported by the earthen materials at the bottom of the hole 142. Again, the riser tube 136 is connected to fitting 134, and the fitting 134 is secured to the perpendicular conduit 110. The spigot 138 is connected to the top of the riser tube. The riser tube 136 and the spigot 138 comprise the yard hydrant 144. The manifold 100 is therefore capable of supplying water to the yard hydrant 144 and otherwise distributing water to other manifolds or other water systems. Once the manifold 100 is connected to the water supply and various water distribution connections, and the yard hydrant 144 is connected to manifold 100, the hole 140 is backfilled with gravel around the manifold 100 and the lower portion of the riser tube 136. The gravel allows water to flow from the drain 135 and not become clogged. Dirt and/or other earthen materials can then be placed on top of the gravel to backfill the hole 140.

Figure 6:
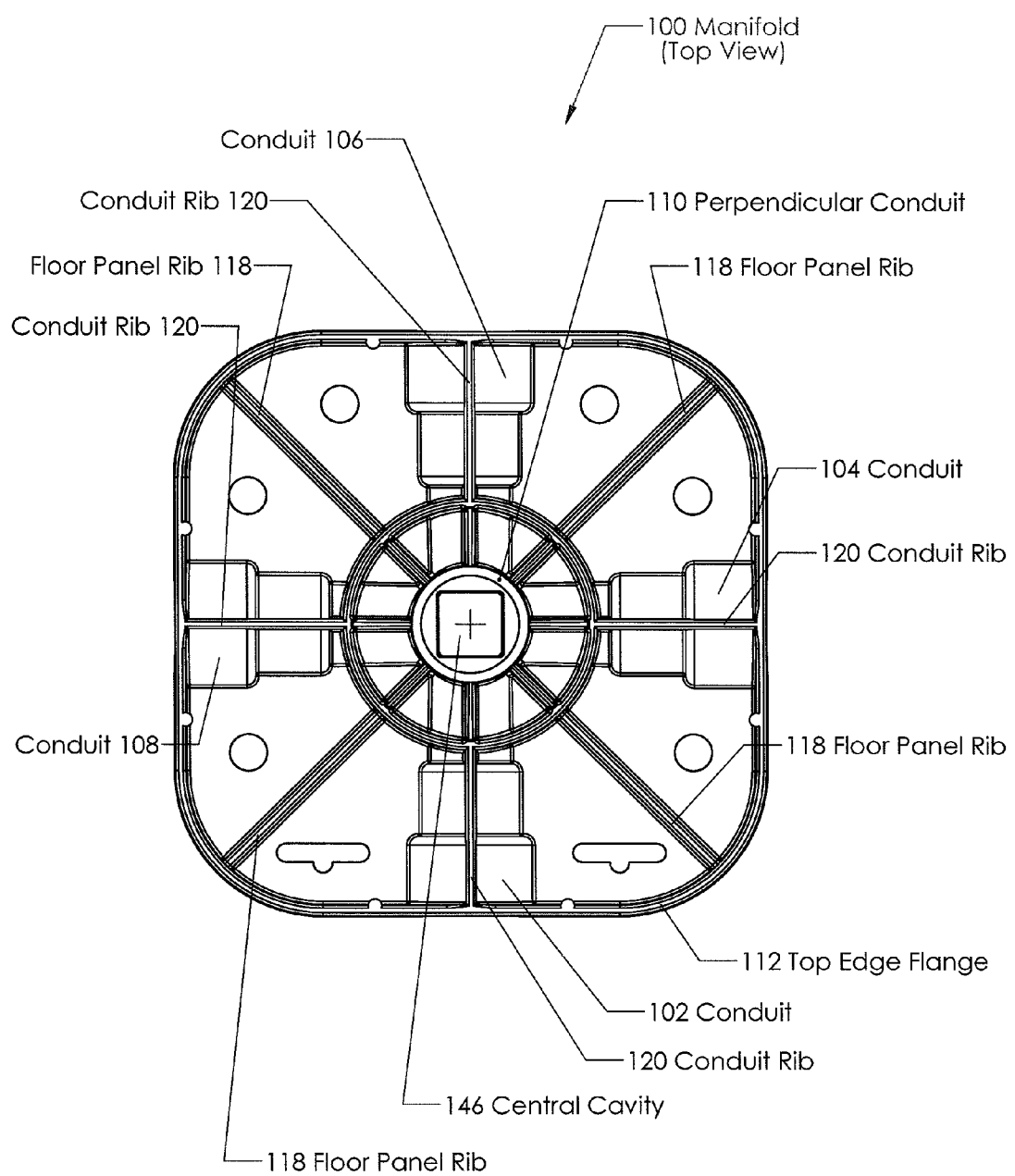
FIG. 6 is a top view of the embodiment of FIG. 1 of the manifold.

FIG. 6 is a top view of the manifold 100. As shown in FIG. 6, the conduits 102, 104, 106, 108 all converge on, and are in communication with, the central cavity 146. The central cavity 146 is in communication with the conduits 102, 104, 106, 108. Additionally, the perpendicular conduit 110 also opens into the central cavity 146. In that regard, water may flow in or out any of the conduits 102, 104, 106, 108 and perpendicular conduit 110 since they all open into a central cavity 146. FIG. 6 also illustrates the floor panel ribs 118. As also shown in FIG. 6, the four conduit ribs 120 are disposed over and aligned with the conduits 102-108. The top view of the manifold 100, illustrated in FIG. 6, also shows the perpendicular conduit 110, which opens to the central cavity 146. Of course, the manifold 100 may be constructed to have various numbers of conduits, depending upon the particular configuration desired.

Figure 7:
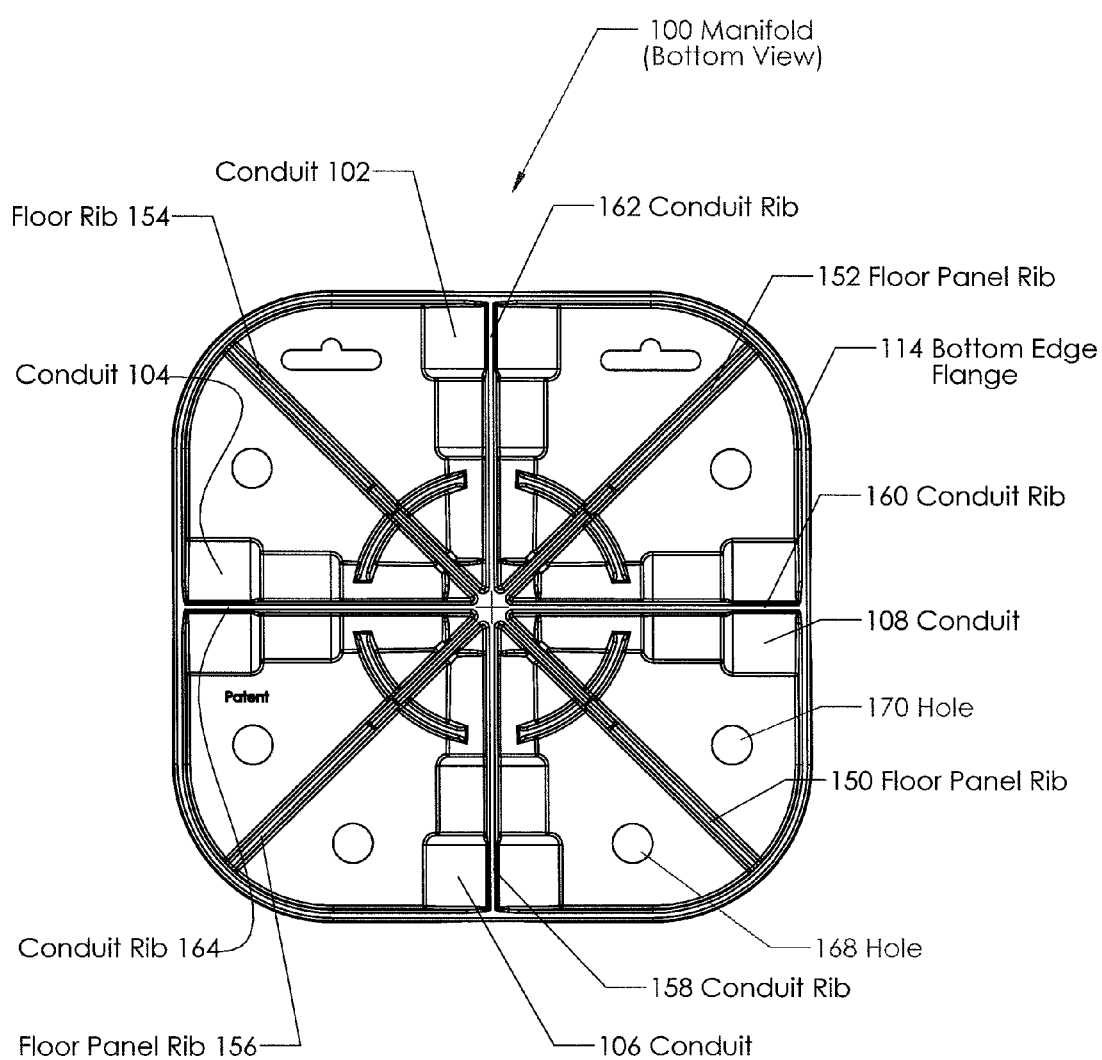
FIG. 7 is a bottom view of the embodiment of FIG. 1 of the manifold.

FIG. 7 is a bottom view of the manifold 100. As shown in FIG. 7, there are a plurality of floor panel ribs 150, 152, 154, 156. Interspersed between the floor panel ribs is a plurality of conduit ribs 158, 160, 162, 164. All of these ribs connect to a central connection point at the center of the bottom portion of the manifold 100. The conduit ribs 158-164 are aligned with and connect to each of the conduits 102, 104, 106, 108. Each of the conduit ribs 158-164 and the floor panel ribs 150-156 connect to the bottom edge flange 114 to provide a solid and sturdy structure for the manifold 100. There are holes, such as holes 168, 170, formed in the floor panels to drain water from the top of the manifold structure 100.

Figure 8:
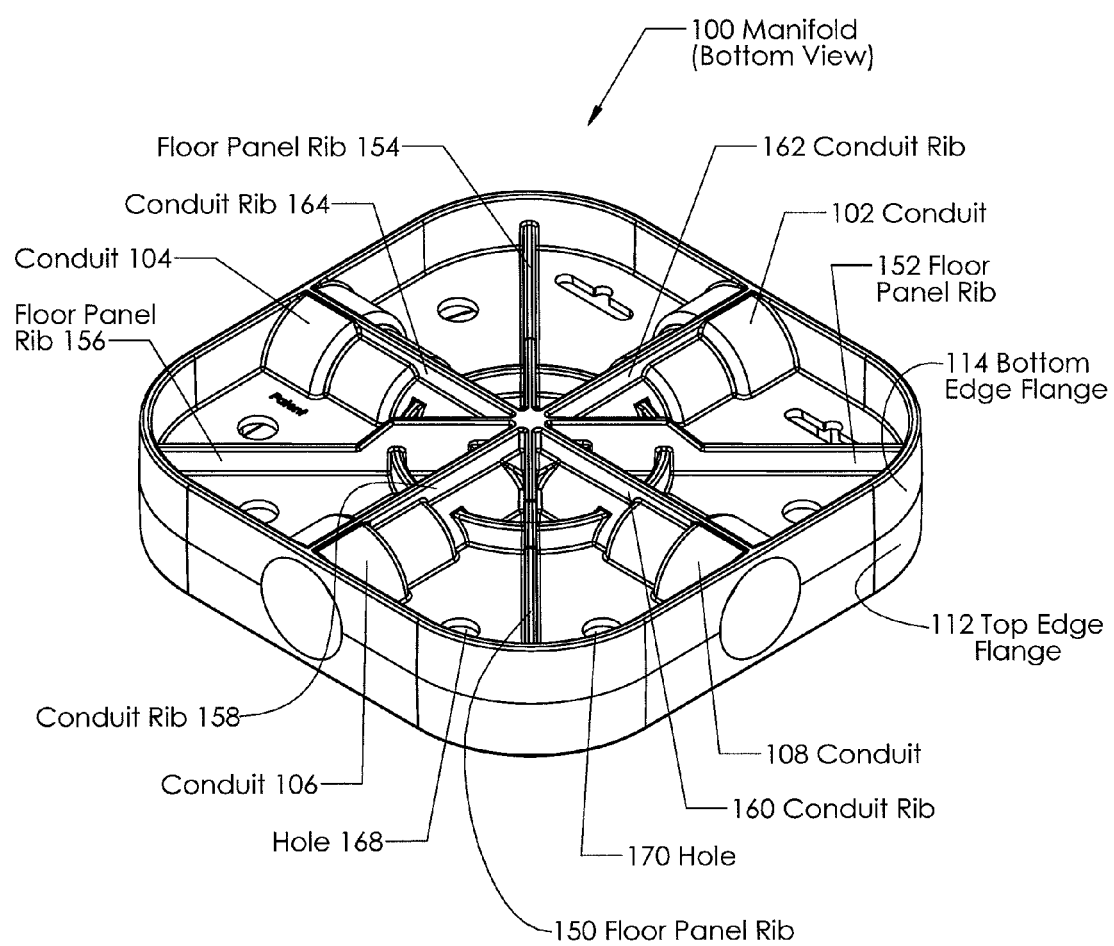
FIG. 8 is a bottom perspective view of the embodiment of FIG. 1 of the manifold.

FIG. 8 is an isometric view of the bottom portion of the manifold 100. Floor panel ribs 150, 152, 154, 156 connect to the bottom edge flange 114 and to each other at the center of the manifold 100. The floor panel ribs 150-156 also connect to the various floor panels illustrated in FIG. 8. Conduit ribs 158, 160, 162, 164 also connect to the bottom edge flange 114, the conduits 102, 104, 106, 108 and are joined in the middle and connect to the floor panel ribs 150-156. Various holes, such as holes 168, 170 are present in the floor panels to allow water to flow through the floor panels. Top edge flange 112 is connected to the bottom edge flange 114, as illustrated in FIG. 8.

Figures 9, 10:
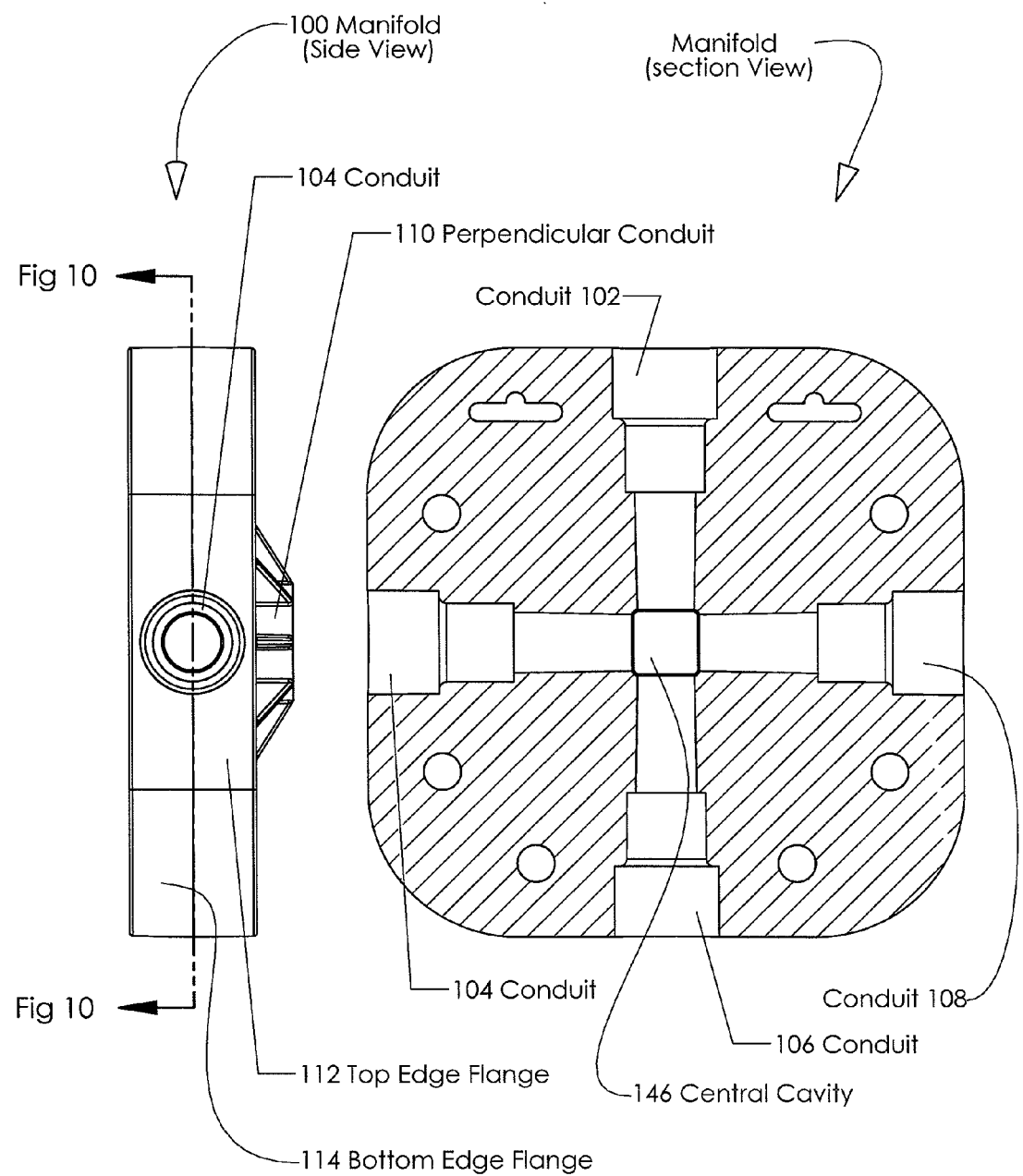
FIG. 9 is a side view of the embodiment of FIG. 1 of the manifold.
FIG. 10 is a cross sectional view, as illustrated in FIG. 9, of the embodiment of FIG. 9 of the manifold.

FIG. 9 is a side view of the manifold 100. As illustrated in FIG. 9, conduit 104 appears on the side of the manifold 100. Conduit 104 is formed both in the top edge flange 112 and bottom edge flange 114. The perpendicular conduit 110 is also present in FIG. 9.

FIG. 10 is a cross-sectional view of FIG. 9, as illustrated in FIG. 9. As shown in FIG. 10, the manifold 100 has a central cavity 146, which is connected to each of the conduits 102, 104, 106, 108. In this manner, water can flow to and from each of the conduits.

Figure 11:
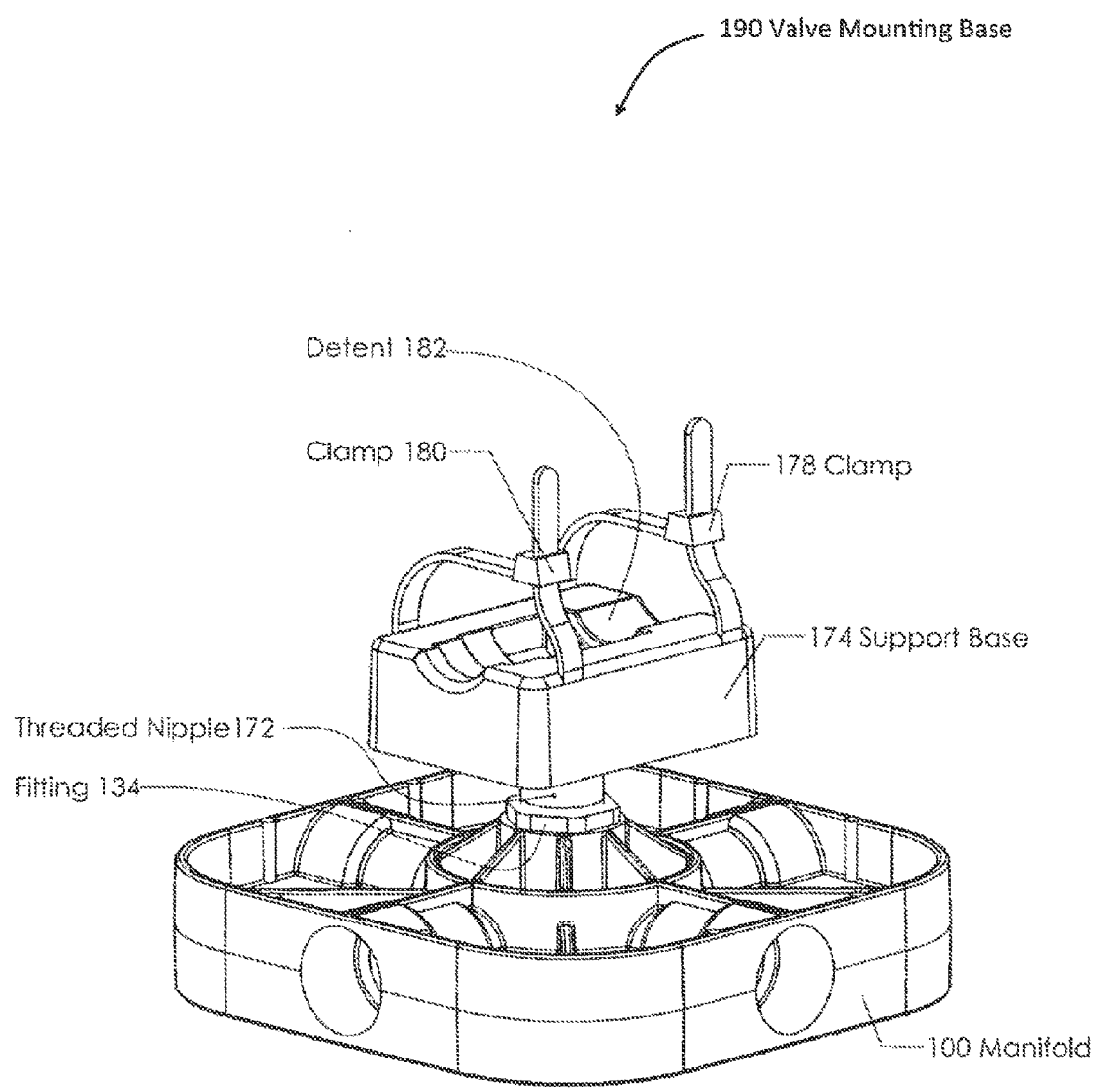
FIG. 11 is a schematic perspective view of an embodiment of a valve mounting base mounted on the manifold.
Figure 12:
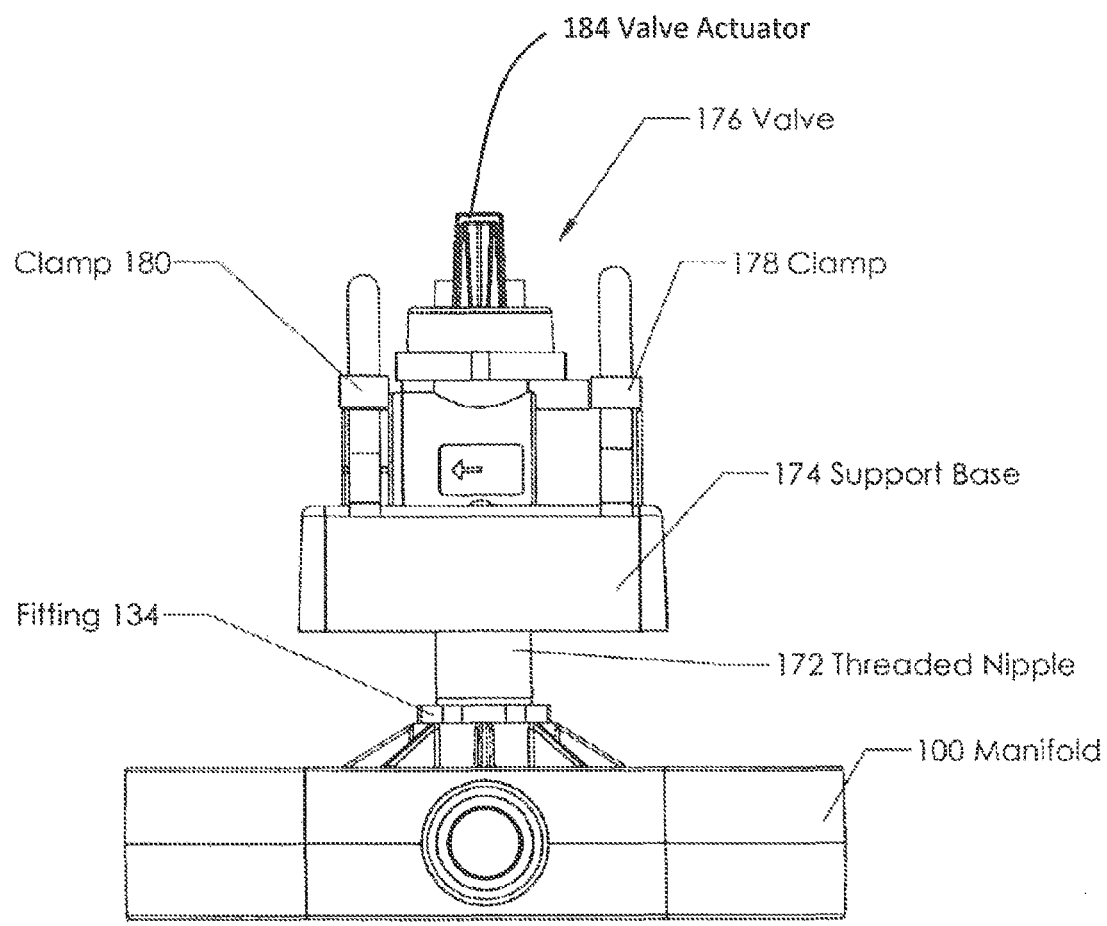
FIG. 12 is a side view of the embodiment of FIG. 11 illustrating the manner in which the valve mounting base is mounted onto the manifold.

FIG. 11 is a perspective view of a valve mounting base 190. As illustrated in FIG. 11, the support base 174 is used as a support for a valve 176 (FIG. 12). The support base 174 is mounted directly onto the manifold 100 in the perpendicular conduit 110. The support base 174 has a detent 182 that conforms to the bottom surface of the valve 176 (FIG. 12). Clamp 178 and clamp 180 function to hold the valve 176 (FIG. 12) on the support base 174 so that the valve will be held in a secure position and can be easily operated.

FIG. 12 is a side view of the embodiment of FIG. 11. As illustrated in FIG. 12, a threaded nipple 172 is threaded into the perpendicular conduit 110 of the manifold 100. In addition, the support base 174 is threaded onto the threaded nipple 172. In this manner, the support base 174 is securely mounted on the manifold 100. The valve 176 is clamped to the support base 174 by clamps 178, 180, which prevents rotation of valve 176. In this manner, the valve 176 can be easily accessed so that the valve actuator 184 can be accessed from above. Although a threaded nipple is shown, any type of mount can be used, such as a short piece of glued pipe.

The embodiments of the present invention therefore provide a sturdy manifold that allows water to be distributed into various locations and provides a perpendicular conduit 110 that can be used to provide a yard hydrant. The manifold 100 provides a sturdy platform for the yard hydrant and will resist sinking in non-compacted ground. Water can be fed into, or out of, each of the conduits 102-108 of the manifold 100 since each of the conduits, including the perpendicular conduit 110, is connected to a central cavity 146.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A plastic manifold for distributing water comprising:
    a top edge flange that extends around an upper peripheral portion of said manifold and that is adapted to engage underground materials to support said manifold;
    a bottom edge flange that extends around a lower peripheral portion of said manifold and that is adapted to engage underground materials to support said manifold;
    a plurality of first conduits that extend from said top edge flange and said bottom edge flange to a central portion of said manifold and intersect at said central portion to form a central cavity;
    a perpendicular conduit that is perpendicular to said plurality of first conduits and intersects said central cavity;
    a plurality of floor panels that are connected to said plurality of first conduits that support said plastic manifold in an underground location by engaging said underground materials.

2. The plastic manifold of claim 1 further comprising:
    a support ring that surrounds said perpendicular conduit and is connected to said floor panels and said conduits.

3. The plastic manifold of claim 2 further comprising:
    a plurality of perpendicular conduit ribs that are connected to said support ring and said perpendicular conduit that support said perpendicular conduit.

4. The plastic manifold of claim 3 further comprising:
    a plurality of floor panel ribs that are connected to said top edge flange, said bottom edge flange, said floor panels and said support ring.

5. The plastic manifold of claim 4 further comprising:
    a valve mounting base adapted to be attached to said plastic manifold.

6. The plastic manifold of claim 5 further comprising:
    a threaded nipple adapted to be screwed into said perpendicular conduit.

7. The plastic manifold of claim 6 further comprising:
    valve mounting straps attached to said valve mounting base to prevent a water valve from rotating.

* * * * *